July 10, 1945.  E. A. BAUMBACH  2,380,287

DOWEL PIN

Filed June 11, 1942

Inventor
Emil A. Baumbach
By Thiess, Olsen & Mecklenburger
Attys.

Patented July 10, 1945

2,380,287

UNITED STATES PATENT OFFICE 2,380,287

DOWEL PIN

Emil A. Baumbach, River Forest, Ill.

Application June 11, 1942, Serial No. 446,563

3 Claims. (Cl. 85—19)

This invention relates to a fastener or dowel pin for securing metal bodies together in desired relationship and particularly to a hardened metal dowel pin which functions to provide auxiliary broaching of openings of bodies to be secured together and forms a rigid joint of increased strength.

It has heretofore been proposed to provide dowel pins with so-called "self-sizing" elements. Such elements may comprise projections on the dowel pin adapted to be flattened when the pin is driven into a hole, or may comprise broaching edges on the periphery of the dowel pin. Broaching dowel pins as heretofore known may comprise a tapered or compressible entering portion and may be provided throughout their length with narrow ridges having sharp edges adapted to shave or broach holes into which the tapering pin may be driven to enlarge, i. e., "self-size," the hole. In order to cut easily into the walls of the hole and to accommodate the relatively large amounts of shavings or scrapings from the walls of the hole, ridges of self-sizing dowel pins heretofore known have been quite narrow in comparison to the width of the depressed portions between them.

It has been found that owing to the tapering or compressible portion of such dowel pins and owing to the relatively small area of the narrow ridge portions contacting the walls of the hole, heavy stresses to which the fastener may be subjected tend to loosen the fastener. Also, and particularly where a shearing stress is set up between objects secured by the self-broaching fasteners or dowel pins known heretofore, the relatively small area of bearing surface of the fasteners or pins is pressed into the walls of the dowel holes and allows relative movement, i. e., side slip, between the objects secured together.

It is an object of the present invention to provide a fastener or dowel pin capable of sustaining high stresses without loosening, and having a portion constructed to broach a hole into which it may be driven to a diameter for smooth engagement with the fastener.

It is another object of the present invention to provide a hardened metal fastener or dowel pin which is substantially cylindrical throughout and which has a relatively large bearing surface which may approach in area the area of a smooth cylinder of corresponding dimensions, a portion of the fastener being constructed to broach a hole into which it may be driven to a diameter substantially equal to the diameter of the cylinder.

It is a further object of the invention to provide a hardened metal dowel pin having a substantially cylindrical bearing surface substantially smooth over the major portion thereof and having a portion comprising broad bearing areas corresponding to the cylindrical contour separated by intersecting relatively narrow continuous grooves and having edges formed to broach holes into which the fastener may be driven to a diameter substantially equal to that of the cylinder.

It is an additional object of the invention to provide a dowel joint capable of withstanding severe stresses wherein two bodies are joined in predetermined relationship by a dowel pin which is substantially cylindrical throughout, having a bearing surface approaching in area the area of a smooth cylinder of corresponding dimensions and having a portion of the fastener constructed to broach dowel holes in the joined bodies to a diameter substantially equal to the diameter of the cylinder.

It is a still further object to provide a simple method for forming my improved dowel pin.

The foregoing and other objects and advantages will be more apparent from the following detailed description when considered in connection with the accompanying drawing, wherein Figure 1 is a sectional elevation of a joint employing a dowel pin according to my invention.

Figure 1:
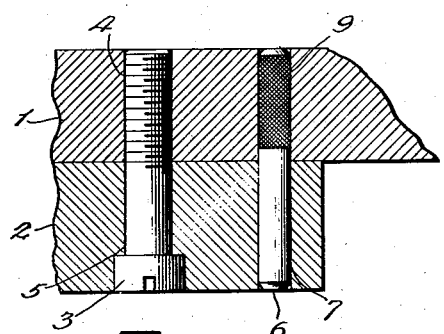

Referring now to the drawing in detail, Figure 1 shows a completed joint between bodies 1 and 2 wherein the bodies are aligned by means of a threaded bolt 3 projecting through holes 4 and 5 in bodies 1 and 2; and wherein a dowel pin 6 constructed according to my invention extends through aligned holes 7 and 9. As shown in the drawing the inside diameter of holes 7 and 9 corresponds exactly with the outer diameter of the dowel pin 6 to hold the bodies 1 and 2 firmly against relative movement.

Figure 2:
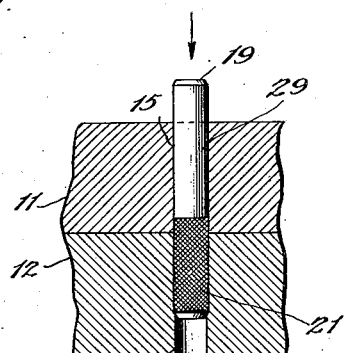
Fig. 2 is a sectional elevation of a joint secured by fasteners according to my invention and showing a dowel pin partially driven into coinciding holes of the bodies to be joined.

Figure 2 shows bodies 11 and 12 which are to be joined together arranged in desired relationship with the dowel holes 15 and 17 in alignment. The dowel pin 19 according to my invention is prefereably a substantially cylindrical body of hardened metal, and is shown in Figure 2 as having been driven through dowel hole 15 and part way into the dowel hole 17 with the broaching portion 21 at the forward end of the pin 19. As more fully described hereinafter, this broaching portion 21 comprising grooves 23 and bearing surfaces 25 (see Figs. 6 and 7) conforming to the cylindrical contour of the pin and defined by the grooves 23, scrapes or broaches the holes 15 and and 17 to a size corresponding to the diameter of the dowel pin 19 by means of cutting edges 27 at the boundaries of the bearing surfaces 25. The cutting edges 27 are substantially in alignment with the smooth clindrical surface of the rear portion 29 of the dowel pin 19, and when the pin 19 is driven into the dowel holes 15 and 17, the edges 27 scrape material from the inner wall of the holes and broach them to a diameter equal to the diameter of the pin to provide close contact between both the bearing surfaces 25 and the smooth cylindrical surface of the rear portion 29 of the dowel pin 19.

Figure 3:
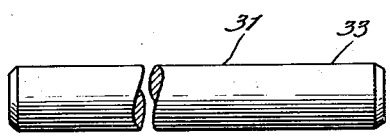
Figs. 3, 4 and 5 are elevational views of a dowel pin according to my invention showing various stages of manufacture.
Figure 4:

Fig. 3 illustrates a dowel pin blank 31 suitable for use in forming the dowel pin 19 of my invention and comprising a smooth cylindrical body usually of steel. The dowel pin blank 31 is knurled adjacent the entering end 33 thereof. In a preferred form shown in Fig. 4, the knurling comprises spaced helical grooves 23 intersecting similar spaced helical grooves 23 and forming a circumferential band around the pin 19 adjacent the entering end 33. The grooves 23 at their deepest portion extend slightly below the general cylindrical contour of the dowel pin 19, while the portions 35 intermediate the grooves 23 are raised by a flow of the metal somewhat above the general cylindrical contour of the pin 19. As exemplary of knurling which has been found satisfactory according to the invention, the deepest portion of the grooves 23 here extended substantially four thousandths of an inch below the general cylindrical contour of the cylinder and the intermediate portions 35 have projected twelve thousandths of an inch above the general cylindrical contour. The band of grooves 23 extends from the entering end 33 a distance substantially less than half the length of the dowel pin 19. It is to be understood that these dimensions are purely exemplary and that other dimensions may be employed.

Figure 5:
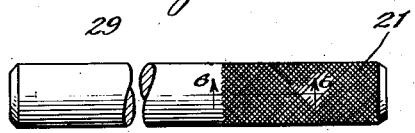

The knurled pin blank 31 is subjected to hardening by any of the usual or known methods and is then ground, e. g., by "centerless" grinding. As shown in Fig. 5, the grinding reduces the portions 35 intermediate the grooves 23 to a cylindrical contour conforming to the cylindrical contour of the pin, and forms the bearing surfaces 25 separated by the grooves 23. This grinding is continued until the width of the intermediate portions, i. e., the distance between adjacent non-intersecting grooves, is greater than and preferably several times the width of any of the grooves to form bearing surfaces 25. The edges 27 formed by grinding, i. e., the lines of juncture of the grooves 23 with the bearing surfaces 25 are sharp and are effective to broach the intermediate walls of the holes into which the dowel pin may be driven.

Figure 6:
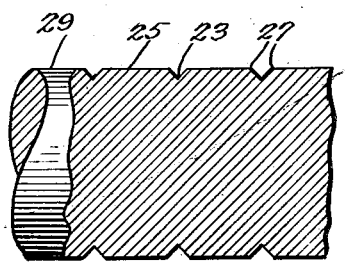
Fig. 6 is a greatly enlarged sectional view, taken on line 6—6 of Fig. 5 of a portion of the broaching structure of a dowel pin according to my invention.
Figure 7:
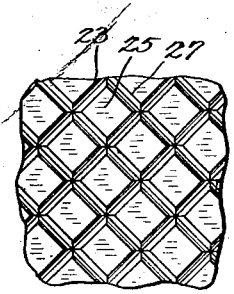
Fig. 7 is an enlarged sectional view of the broaching portion of a dowel pin of my invention showing the cutting edges and illustrating the relative widths of the grooves and of the bearing surfaces.

Figs. 6 and 7 illustrate the relative widths of the bearing surfaces 25 and the grooves 23. As shown in the figures, the surface area of the grooved or broaching portion 21 of the pin 9 approaches that of a smooth cylinder and because of the large area, the joint between bodies connected by such a dowel pin will be capable of sustaining heavy stresses without side slip or loosening. It is to be noted that although the grooves 23 are comparatively small, the material scraped from the inner surface of a dowel hole does not build up in the grooves but passes along through the interconnecting network of channels formed by the intersecting grooves. This fact permits the use of a higher ratio of bearing surface area and width to groove area and width than has heretofore been considered possible.

Figure 8:
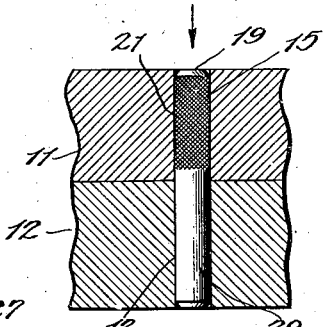
Fig. 8 is a sectional elevation of a re-formed joint employing a dowel pin according to my invention.

As noted above, the grooved or broaching portion 21 of the dowel pin is preferably restricted to the entering section 33 of the dowel pin 9. This construction is of particular advantage where the bodies joined by the dowel pin must be separated, because, as shown in Fig. 8, the bodies may be reassembled by means of the same dowel pin without additional broaching to form a smooth and tight joint comparable to the original joint by reversing the dowel pin and inserting the smooth rear portion 29 of the dowel pin 19 into the dowel holes 15 and 17. As above pointed out, the broaching portion 21 has broached the dowel holes 15 and 17 to a diameter substantially equal to that of the dowel pin 19 when the pin 19 was first driven in. Accordingly, when the dowel pin 19 is again driven into the broached holes 15 and 17, with the smooth portion first, a perfect fit is again obtained and further broaching of the holes is avoided.

Thus it is seen that my invention is to provide a dowel pin which is self-broaching, i. e., broaches holes into which it is driven to a diameter to insure perfect fit which provides a large bearing surface over its entire length so that its bearing surface and its resistance to stress are substantially equal to that of the perfectly smooth cylindrical dowel pin. The joint formed is exceptionally strong and rigid and at the same time allows a reasonable degree of tolerance in the original relative sizes of dowel pin and dowel holes.

The pin is also of particular advantage for reuse to provide a rigid joint between two bodies which it is desired to reassemble after they have been separated.

I have also provided a simple method of forming my improved dowel pin involving a minimum of steps and requiring no new or unusual machinery.

Having thus described this invention, what is claimed and desired to be secured by Letters Patent is:

1. A fastening member for use to form joints capable of sustaining high stresses comprising a substantially cylindrical body, grooves in the cylindrical surface intersecting other grooves, and bearing surfaces defined by the grooves conforming substantially to the cylindrical contour and having substantially greater area than the area of the grooves to provide a large bearing surface, said grooves being wider at the top than at the bottom whereby the edges of the grooves broach the material into which the fastening member is driven, the entire surfaces between said grooves lying in said cylindrical surfaces, said grooves extending to the entering end of the cylindrical surface.

2. A hardened metal dowel pin comprising a substantially cylindrical body, spaced helical grooves in the cylindrical surface adjacent one end of the body and bearing surface portions defined by the grooves having their surfaces conforming to the cylindrical shape of the dowel pin and having substantially greater width than the width of the grooves, the lines of juncture between the bearing portions and the grooves forming a cutting edge adapted to broach the inner surface of dowel holes into which the dowel pin may be inserted to a diameter corresponding substantially exactly to the diameter of the pin to provide smooth contact between the cylindrical surface of the pin and the inner surface of the hole and form a joint capable of sustaining high stresses, said grooves being wider at the top than at the bottom whereby the edges of the grooves broach the material into which the dowel pin is driven, the entire surfaces between said grooves lying in said cylindrical surfaces, said grooves extending to the entering end of the cylindrical surface.

3. A hardened metal dowel pin comprising a substantially cylindrical body, intersecting right and left-hand spaced helical grooves in the cylindrical surface adjacent one end of the body, and diamond-shaped bearing surface portions defined by the grooves having their surfaces conforming to the cylindrical shape of the body and having substantially greater width than the width of the grooves, the lines of juncture between the bearing portions and the grooves forming a cutting edge adapted to broach the inner surface of dowel holes of bodies joined by insertion of the dowel pin to a diameter corresponding substantially exactly to the diameter of the dowel pin to provide smooth contact between the cylindrical surface of the dowel pin and the inner surface of the holes and form a joint capable of sustaining high stresses without side slip or loosening, said grooves being wider at the top than at the bottom whereby the edges of the grooves broach the material into which the dowel pin is driven, the entire surfaces between said grooves lying in said cylindrical surfaces, said grooves extending to the entering end of the cylindrical surface.

EMIL A. BAUMBACH.